United States Patent

[11] 3,615,833

[72] Inventor Ernest M. Jost
 Plainville, Mass.
[21] Appl. No. 630,272
[22] Filed Apr. 12, 1967
[45] Patented Oct. 26, 1971
[73] Assignee Texas Instrument Incorporated
 Dallas, Tex.

[54] BATTERY ELECTRODE AND METHOD OF MAKING THE SAME
 5 Claims, 3 Drawing Figs.

[52] U.S. Cl ..................................................... 136/28,
 136/120 R
[51] Int. Cl ..................................................... H01n 43/04
[50] Field of Search .................................... 136/28, 29,
 120

[56] References Cited
 UNITED STATES PATENTS

| | | | |
|---|---|---|---|
| 3,389,019 | 6/1968 | Biro .............................. | 136/120 |
| 3,009,979 | 11/1961 | Corren et al. ................ | 136/29 |
| 3,262,815 | 7/1966 | Langer et al. ................ | 136/28 |
| 3,338,751 | 8/1967 | Barber .......................... | 136/28 |
| 3,342,640 | 9/1967 | Herold et al. ................ | 136/28 |
| 3,347,707 | 10/1967 | Southworth et al. ......... | 136/28 |
| 3,351,490 | 11/1967 | Hermann-Hans von Doehren | 136/28 |

*Primary Examiner*—Winston A. Douglas
*Assistant Examiner*—C. F. Lefevour
*Attorneys*—Harold Levine, Edward J. Connors, Jr., John A. Haug and James P. McAndrews

ABSTRACT: A nickel electrode for an alkaline electrolyte battery is shown to incorporate electrochemically active nickel material secured to an electrically conductive substrate and to have an electrochemically active substance such as silver oxide, manganese dioxide or ferric hydroxide of more positive electrochemical potential than the active nickel material dispersed in the active nickel material for retarding the evolution of oxygen at the electrode during charging of the battery.

The nickel electrode is made by mixing particles of the active nickel material in its charged state together with particles of a fusible binder and with particles of the material of more positive electrochemical potential, the latter material being in its discharged state. This particulate mixture is then spread upon an electrically conductive substrate and is heated to fuse the binder particles for securing the other mixture particles to each other and to the substrate to form a porous electrode structure.

INVENTOR,
Ernest M. Jost,
BY
James P. McAndrews
Att'y.

BATTERY ELECTRODE AND METHOD OF MAKING THE SAME

BACKGROUND OF THE INVENTION

In an alkaline electrolyte battery incorporating a conventional positive nickel electrode having electrochemically active nickel material supported on an electrically conductive substrate, the primary reaction occurring at the positive electrode during charging of the battery raises the oxidation state of the active nickel material. When such a battery is charged by means of a conventional constant-current charging source, this oxidation of the active nickel material tends to occur at a specific positive electrochemical potential. That is, the active nickel material is oxidized at selected electrode potential and only gradual increase in electrode potential is noted during the early stages of the oxidation of the active material. Then, when a part of the active nickel material has been raised to its higher oxidation state—but before all of the active material has been oxidized—oxygen gas is evolved at the electrode. This evolution of oxygen is accompanied by a further, but still relatively small, increase in electrode potential.

In a conventional, sealed nickel-cadmium battery or the like, oxygen gas evolved in the battery during charging is recombined within the battery to avoid the development of excessive internal battery pressures. However, as heat is evolved during such recombination of the oxygen gas, the rate of charging of the battery must be very carefully monitored and limited to avoid excessive oxygen evolution and overheating of the battery. It would be highly desirable if the evolution of oxygen gas in the battery could be significantly retarded or avoided to permit battery charging without developing excessive battery temperatures or pressures.

SUMMARY OF THE INVENTION

It is an object of this invention to provide a novel and improved positive battery electrode which retards the evolution of oxygen at the electrode until the electrode has been substantially charged; to provide such an electrode which is characterized by high charge capacity; to provide such an electrode which displays a very sharp increase in electrode potential when oxygen gas is first evolved at the electrode during charging with a constant-current charging source, thereby clearly indicating the point at which charging of the electrode is desirably terminated; and to provide novel and improved methods for making such electrodes.

In accordance with this invention, a positive electrode for use in an alkaline electrolyte battery comprises electrochemically active material such as active nickel material secured to an electrically conductive substrate, the electrode having an electrochemically active substance of more positive electrochemical potential that the active nickel material dispersed in the active nickel material for retarding the evolution of oxygen gas at the electrode during charging of the battery. For example, in a preferred electrode construction, particles of electrochemically active nickel material, preferably in its charged state, are mixed together with a fusible particulate binder of polyethylene or the like and with particles of an electrochemically active material such as silver oxide [$Ag_2O$], manganese dioxide [$MnO_2$] or ferric hydroxide [$Fe(OH)_3$] which has a more positive electrochemical potential than the active nickel material. Ferric hydroxide is also referred to as hydrated ferric oxide [$Fe_2O_3 \cdot H_2O$]. The particles of ferric hydroxide represent the material of more positive electrochemical potential in its discharged state. This particle mixture is spread upon an electrically conductive substrate such as a nickel screen and is heated for fusing the binder particles to the active nickel particles, to the particles of more positive electrochemical potential, and to the substrate to form a porous electrode structure. The active nickel material particles and the particles of more positive potential characteristics are secured in electrically conductive relation to each other and to the substrate. In this way, the electrode structure incorporates the active nickel material in a convenient electrode arrangement having the particles of more positive electrochemical potential dispersed throughout the active nickel material. Each of the particulate electrode materials is used in a stable form which facilitates manufacture of the electrode structure.

When such an electrode is charged in an alkaline electrolyte battery system, the electrode is charged to a significantly higher level than comparable prior art electrodes before oxygen gas is evolved at the electrode. That is, oxygen evolution in the battery is significantly retarded by use of the electrode of this invention. Further, the material of more positive electrochemical potential which contributes so significantly to the retardation of oxygen evolution also contributes to at least some extent to the charge capacity of the electrode. In addition, the initial evolution of oxygen at the electrode is accompanied by a very sharp increase in electrode potential, clearly indicating the point at which oxygen is being evolved and the point at which charging of the electrode is desirably terminated. The electrode is also manufactured in a convenient process so that the electrode is of inexpensive construction.

Other objects, advantages and details of the electrode of this invention appear in the following detailed description of preferred embodiments of the invention.

DESCRIPTION OF THE PREFERRED EMBODIMENTS

In accordance with this invention, particles of an electrochemically active nickel material are combined with particles of a suitable binder and with particles of an electrochemically active material such as silver oxide [$Ag_2O$], manganese dioxide [$MnO_2$] or ferric hydroxide [$Fe(OH)_3$] having a more positive electrochemical potential than the active nickel material. That is, the materials of more positive electrochemical potential, when mounted on an electrode and charged, are adapted to be raised electrochemically to higher oxidation states only at electrode potentials significantly higher or more positive than the electrode potential at which the active nickel materials are electrochemically oxidized. These ingredients are thoroughly mixed together, are spread upon an electrically conductive substrate and are heated for fusing the binder particles to secure the active nickel materials and the particles of more positive electrochemical potential to each other and to the substrate.

For example, eight parts by weight of particles of electrochemically active nickelic hydroxide material, preferably β-nickelic hydroxide [$\beta$-NiOOH] of about 100 microns particle size or less, are combined with a relatively much smaller quantity such as one part by weight of silver oxide [$Ag_2O$] particles, preferably of a particle size about 100 microns or less. The nickel hydroxide particles are prepared for example in the manner described in the copending application entitled Method of Making Electrochemically Active β-Nickelic Hydroxide filed in the name of Popat, Rubin and Schneider on or about Mar. 1, 1967, which application is now owned by the assignee of the present application. To these ingredients is added one part by weight of fusible binder particles. For example, an aqueous suspension of polyethylene particles of a size on the order of about 0.5 microns is added to the other particles, the binder suspension embodying approximately 60 percent solids by weight. This combination of ingredients is thoroughly mixed as indicated at 10 in FIG. 1, together with additional distilled water if required, to form a paste 12 which can be easily spread.

Figure 1:
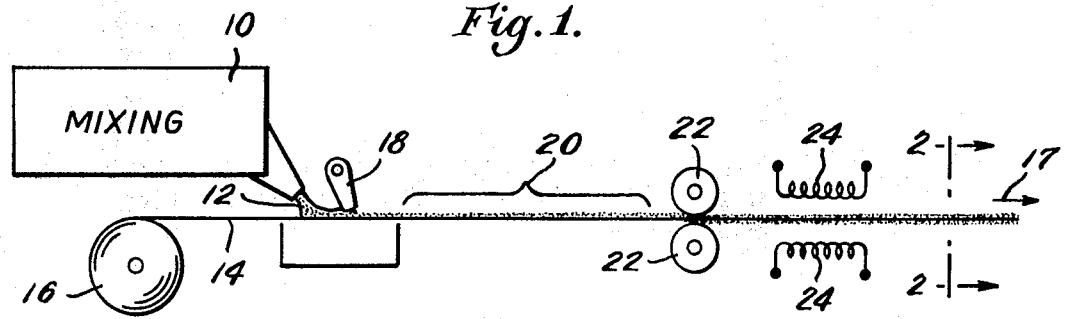
FIG. 1 is a diagrammatic view illustrating the manufacture of electrodes in accordance with this invention.

An electrically conductive substrate material such as a woven wire mesh nickel screen 14, for example a No. 4/0 screen of 0.005-inch wire diameter, is then fed progressively from a supply reel 16 in the direction indicated by the arrow 17 in FIG. 1. Other conductive foraminous substrates such as woven or expanded metal screens of nickel, steel or the like may also be used within the scope of this invention. The paste 12 is fed onto the screen as the screen is moved past the mixing means 10 and a doctor blade means 18 spreads the paste to form a paste layer of substantially uniform thickness, preferably about 0.025 inch thick, on the screen.

As the pasted screen is further advanced in the direction 17, the paste is at least partly air dried at room temperature as indicated at 20 in FIG. 1. The dried pasted screen is then passed between the rolls 22 of a conventional rolling mill where the paste material is compressed and compacted so that the paste material is pressed into the screen to form the particulate material around all surfaces of the screen substrate. That is, the particulate materials are compacted so that they substantially surround the surfaces of the substrate materials while forming a porous structure. The pasted screen is preferably compressed with a force of about 10,000 pounds per square inch to form a highly porous structure of a total thickness of about 0.025 inch. As the pasted and pressed screen is further fed in the direction 17, the screen and paste are heated by any conventional means 24 so that the particulate binder material in the paste is fused to the active nickel material particles, to the particles of more positive electrochemical potential and to the screen. In this way, the particulate materials are secured to the screen to form the desired porous positive electrode. As will be understood, any conventional means are employed for advancing the screen 14 in the direction 17.

Figure 2:
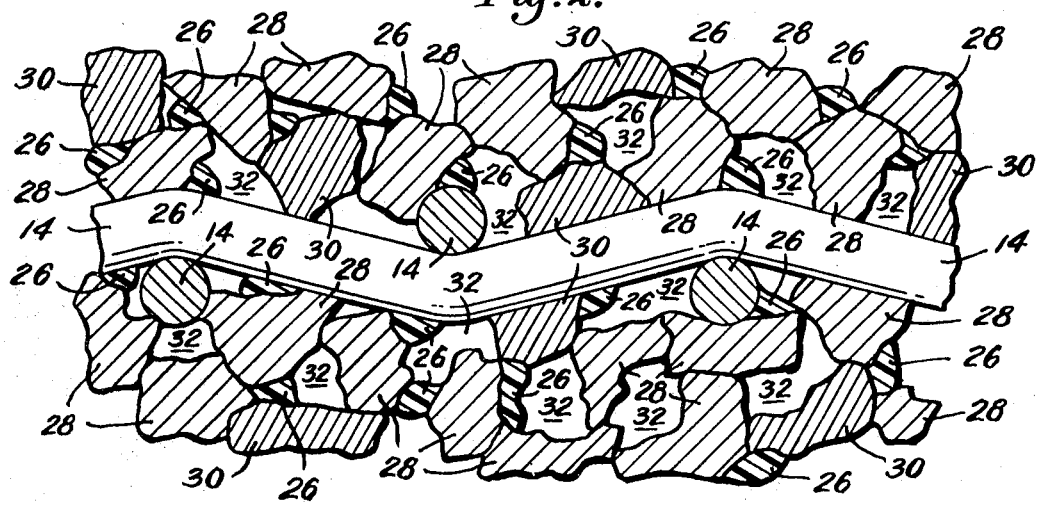
FIG. 2 is a section view to greatly enlarged scale along line 2—2 of FIG. 1.

As shown in FIG. 2, the porous electrode structure formed in the manner above described incorporates electrochemically active nickelic hydroxide particles 28 and particles 30 of silver oxide, a material of more positive electrochemical potential, which are secured to each other and to the electrically conductive substrate 14 by the fused binder particles 26 while leaving a large number of pores 32 within the electrode structure. The particles 28 and 30 are secured in electrically conductive relation to each other and to the substrate 14.

When the porous electrode structure of this invention is cut to suitable electrode size in any conventional manner and is charged and discharged together with a suitable counterelectrode in an alkaline electrolyte battery system, preferably an aqueous solution of potassium hydroxide, the primary reactions occurring at the electrode change the oxidation state of the electrochemically active nickel material. That is, when the electrode is discharged, the nickelic hydroxide is reduced to nickelous hydroxide $[Ni(OH)_2]$; when the electrode is charged, the nickelous hydroxide is electrochemically oxidized to reform the original nickelic hydroxide.

In the electrode of this invention, secondary and tertiary reactions also tend to occur during charging and discharging of the electrode. In the secondary reaction occurring during charging of the electrode, the silver oxide constituent $[Ag_2O]$ of the electrode is oxidized and is believed to form the silver compound $[AgO]$, embodying silver in a higher oxidation state; then upon discharging of the electrode, this silver compound is reduced to reform the original silver oxide $[Ag_2O]$. In the tertiary reaction tending to occur during charging of the electrode, oxygen is evolved at the electrode by electrolysis of the electrolyte.

An important feature of the electrode of this invention is that, when the electrode is charged using a conventional constant-current charging source, a very substantial part of the primary reaction is completed before the described secondary and tertiary reactions tend to occur. That is, the potential of the positive electrode remains advantageously low during charging of the electrode until substantially all of the active nickel material in the electrode has been raised to its higher oxidation state. As the active nickel material comprises by far the greatest part of the active electrode material, substantially no oxygen gas is evolved at the electrode until the electrode has been substantially fully charged. Only when substantially all of the active nickel material has been oxidized does the secondary reaction tend to occur at any significant rate. Further, when the secondary reaction begins to occur at a significant rate, there is a sharp rise or increase in the positive potential of the electrode, providing a clear means for indicating the point at which charging of the battery system is desirably terminated. The tertiary reaction resulting in the evolution of oxygen gas occurs only after the sharp rise in electrode potential initiated by the occurrence of the secondary reaction.

Figure 3:
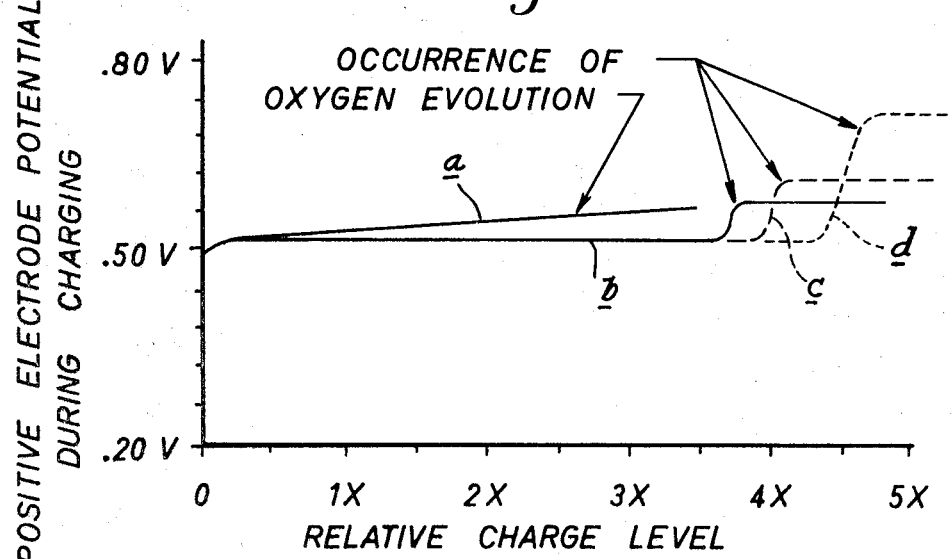
FIG. 3 is a graph illustrating advantageous characteristics of the electrode of this invention.

For example, where the charging of a typical prior art positive nickel electrode is characterized by a gradual increase in positive electrode potential and by early evolution of oxygen gas at the electrode as indicated by curve $a$ in FIG. 3, the charging of the electrode of this invention, embodying silver oxide as above described, is characterized by a relatively constant electrode potential until the electrode has been substantially fully charged as indicated by curve $c$ in FIG. 3. Oxygen gas is evolved at the electrode only at a much later stage in the charging cycle as indicated in FIG. 3 and the oxygen gas evolution is preceded by a sharp rise in electrode potential associated with the secondary electrode reaction. When charging of the electrode is terminated in response to this sharp potential increase, oxygen evolution of the electrode is substantially avoided.

In other embodiments of the electrode of this invention electrochemically active manganese dioxide $[MnO_2]$ or ferric hydroxide $[Fe(OH)_3]$, also of more positive electrochemical potential than active nickel material, are used in place of silver oxide $[Ag_2O]$ in the electrode formulation above described with corresponding results. That is, where the electrode embodies particles of manganese dioxide dispersed in active nickel material, the secondary reaction tending to occur during charging of the electrode oxidizes the manganese dioxide to form permanganate ion $[MnO_4^{11}]$, the occurrence of this reaction also taking place after a large part of the active nickel material has been oxidized and being accompanied by a sharp rise in electrode potential as indicated by curve $b$ in FIG. 3. Similarly, where the electrode embodies ferric hydroxide dispersed in the active nickel material, the secondary reaction tending to occur during charging of the electrode oxidizes the ferric hydroxide to form the ferrate ion $[FeO_4^{11}]$, the occurrence of this reaction taking place after a large part of the active nickel material has been oxidized and being accompanied by a sharp rise in electrode potential as indicated by curve $d$ in FIG. 3. During discharge of such electrodes, the permanganate and ferrate ions are reduced to reform manganese dioxide and ferric hydroxide respectively.

It will be noted that, in the process of this invention, the electrodes are preferably formed with electrochemically active nickel particles such as $\beta$-nickelic hydroxide in their charged or higher oxidation states whereas the active materials of higher electrochemical potential incorporated in the electrodes are preferably used in their discharged or lower oxidation states. Thus each of the active particulate materials are in their more stable and easily handled state while being formed into the desired electrode structure.

It should be understood that although particular embodiments of the electrodes and methods of this invention have been described by way of illustration, this invention includes all modifications and equivalents thereof which fall within the scope of the appended claims.

I claim:

1. A positive electrode for use in an alkaline electrolyte battery system comprising electrochemically active particulate nickelic hydroxide, a discrete electrochemically active particulate material selected from the group consisting of silver oxide, manganese dioxide, and ferric hydroxide, said last-named active material being dispersed in said active nickelic hydroxide, an electrically conductive foraminous substrate, and particles of plastic binder material, said binder particles being fused to said active particulate materials and to said substrate for securing said active materials to each other and to said substrate to form a porous electrode structure.

2. A positive electrode as set forth in claim 1 wherein said active material particles are secured in electrically conductive relation to each other and to said substrate.

3. A positive electrode as set forth in claim 1 wherein said particulate materials substantially surround said substrate for shielding said substrate from the electrolyte in a battery system.

4. A method for making a positive nickel electrode for use in an alkaline electrolyte battery system comprising the steps of uniformly mixing electrochemically active particulate nickelic hydroxide together with a discrete electrochemically active particulate material selected from the group consisting of silver oxide ($Ag_2O$), manganese dioxide ($MnO_2$) and ferric hydroxide ($Fe(OH)_3$) and with particles of a fusible plastic binder for dispersing said binder particles and said last named electrochemically active particles in said active nickelic hydroxide particles, spreading said particulate mixture on a foraminous electrically conductive substrate, and heating said particulate mixture for fusing said binder particles to said active material particles and to said substrate to form a porous electrode structure.

5. A method as set forth in claim 4 wherein said particulate materials are compacted prior to heating for substantially surrounding the surfaces of said substrate to form a porous electrode structure.

* * * * *